United States Patent [19]
DePirro

[11] Patent Number: 4,624,280
[45] Date of Patent: Nov. 25, 1986

[54] AUTOMATIC GATE VALVE SHUT-OFF DEVICE

[76] Inventor: Mario DePirro, 133 S. Westmore, Lombard, Ill. 60148

[21] Appl. No.: 712,423

[22] Filed: Mar. 18, 1985

[51] Int. Cl.[4] .............................................. F16K 31/04
[52] U.S. Cl. ................................. 137/392; 137/487.5; 251/129.12
[58] Field of Search ........................... 137/392, 487.5; 251/134, 129.12; 318/266, 267

[56] References Cited

U.S. PATENT DOCUMENTS

| | | | |
|---|---|---|---|
| 2,059,635 | 11/1930 | Fillo | 251/134 X |
| 2,483,322 | 9/1949 | Miller | 251/134 X |
| 3,180,358 | 4/1965 | Cogdell | 318/267 X |
| 3,616,884 | 11/1971 | Jurge | 251/134 |
| 3,862,739 | 1/1975 | Fujiwara | 251/134 X |

*Primary Examiner*—Alan Cohan
*Attorney, Agent, or Firm*—Basil E. Demeur; Robert E. Knechtel

[57] ABSTRACT

There is disclosed a system for automatically closing a gate valve of the type customarily installed in a sewer pipe system, the gate valve being positioned such as to divide the pipe into a forward exit section and a rear exit section, the system including fluid sensing means positioned in the forward exit section of the pipe adapted to sense the fluid level, a two phase motor having a forward phase and a reverse phase operationally associated with the gate valve for alternately opening and closing the gate valve, electrical means interconnecting the fluid sensing means and the motor to activate the motor in response to the fluid level sensed by the fluid sensing means, the motor including switch activation means associated therewith and mounted for arcuate movement about a pivot point, and switch means for alternately controlling the forward and reverse phases of the motor, the switch means being mounted in position within the arcuate path of travel of the switch activation means.

6 Claims, 6 Drawing Figures

AUTOMATIC GATE VALVE SHUT-OFF DEVICE

BACKGROUND OF THE INVENTION

The present invention relates to a system for automatically opening and closing a gate valve of the type commonly used in connection with sewer systems as applied to either a residential or commercial building installations. As is well known, gate valves are traditionally installed for the purpose of preventing backflow of sewer water or other undesired fluid forced back through a pipe due to extreme back pressure. In the typical installation, such gate valves are manually operable by means of a circular wheel which is rotated by the user in order to close the valve thereby occluding the sewer pipe in situations where it is anticipated that a back pressure is being created which may possibly cause a back pressure flow of the undesired fluid.

For example, in home installations, gate valves are typically installed adjacent to the sump pumps such that when a situation arises where the sump pump can no longer handle the tremendous rise of the water level from rain water or the like, and it is evident that a back pressure situation is being created in the municipal sewer system, the gate valve may be closed thereby to occlude the sewer pipe and prevent the municipal sewer water from being forced back into the home due to the extreme water pressure being created. However, it is evident that in order to operate the gate valve, the homeowner must be present, and must manually reciprocate the gate valve in order to effect a closing off of the sewer pipe. In addition, in many instances, the homeowner may not even be alert to the fact that a back pressure situation may exist, and hence, sewer water may be backing into the system and into the home, without the homeowner having a sufficient warning in order to actually manipulate the gate valve and close the house off from the municipal system.

In order to overcome some situations relating to the lack of awareness of the homeowner, various systems have been developed in the nature of alarm systems which would alert the homeowner to a back pressure situation. Various prior patents deal with alarm systems created for such situations set for the purpose of alerting and warning the occupant of the need to close the gate valve. For example, U.S. Pat. No. 2,773,251 discloses a back flow prevention and alarm device, which in reality, is simply an alarm system for indicating leakage in a check valve or for the presence of back flow conditions. It is disclosed therein, the device depicted in the subject patent takes advantage of a pressure differential existing as between the valve chamber and the pressure in the supply line, which come under normal conditions, will not activate the contacts, but under a back flow situation, will activate the contacts to the alarm bell thereby to alert the occupant to a back flow situation, or at least the leakage of the valve. Under extreme conditions, the alarm is sounded in order to alert the operator to take such measures as may be necessary to prevent back flow from occurring.

Similarly, U.S. Pat. No. 4,398,186 is again directed to a sewer back up warning system which utilized an electrically conductive float which rises under conditions of back flow thereby to activate a rod which in turn completes an electrical circuit containing the back up alarm. It is evident that with respect to the two patents discussed herein, both disclose only an alarm system, which when activated, still requires that the operator manually close the gate valve in response to a back flow situation.

Other prior art patents have similarly attempted to devise systems for relieving the back flow pressure, such as that disclosed in U.S. Pat. No. 4,392,128. The device disclosed therein incorporates a blow-off cap including an alarm which is set off by the rising fluid immersing to contacts. As is disclosed therein, a buzzer is set off due to the rising water level, after which a blow-off cap may be exploded due to the water pressure in order to relieve the back flow pressure, although the back flow of fluid is certainly not prevented. Hence, it is still incumbent upon the oocupant to take such steps as may be necessary in order to manipulate a gate valve in order to close off the sewer pipe and stop the undesired back flow of fluid.

In terms of a system designed to actually shut off the back flow of fluid in a back flow situation, U.S. Pat. No. 4,432,388 discloses an automatic system for preventing the back up of sewage in a gravity discharge line. As disclosed therein, the device consists of an expandable bladder consisting of a folded or a pleated bladder which will expand when a reverse flow of the fluid is present. Hence, while the device disclosed therein does not operate a gate valve in order to shut off the sewer line, the device is intended for insertion into the sewer pipe line, and when a reverse flow of the fluid is realized, the bladder will expand until the opening in the sewer pipe is occluded. Legably, when the back flow situation subsides, the fluid would be expunged from the bladder such that the pleats or folds in the bladder reappear, thereby to open the fluid flow path in the proper direction.

Attempt to create an automatic system for occluding the sewer pipe is disclosed in U.S. Pat. No. 2,630,875. As shown therein, the invention consists in providing a back water valve which may be associated with a drain pipe, or the like, and may be manually operated, or automatically operated by means responsive to the rising or backing up of water in the sewer pipe or floor drain. When that does occur, the valve, upon the rise of the water, will immediately be closed and remain in such position until the liquid recedes, after which the valve will again be brought to the open position. Hence, in order for a system of the type disclosed in U.S. Pat. No. 2,630,875 to be operable, an additional valve must be positioned in the sewer line in order to operate properly.

What is significant is that the prior art has not yet been able to provide a system which may be retrofitted to an existing gate valve, and which will operate to automatically open and close the gate valve in response to a back pressure situation such as created by heavy rains, flooding or the like. The present invention is intended to provide a system which will automatically operate an existing gate valve, and which may be retrofitted to the same, such that the gate valve will be opened and closed in response to the rising and falling of the fluid in the sewer pipe, automatically, without the need of providing additional valves or the like.

OBJECTS AND ADVANTAGES

It is therefore the prinicpal object of the present invention to provide a system which may be retrofitted to any existing gate valve, which will operate to automatically open and close such gate valve in response to the rising or falling of the fluid level in the pipe.

In connection with the foregoing object, it is a further object of the invention to provide a system for automatically activating a gate valve of the type positioned in the fluid flow path of a pipe such as to divide the pipe into a forward exit section and a rear exit section, the system including fluid sensing means positioned in the forward exit section of the pipe adapted to sense the fluid level of the pipe, a two phase motor having a forward phase and a reverse phase operationally associated with the gate valve for alternately opening and closing the gate valve, electrical means interconnecting the fluid sensing means in the motor in order to activate the motor in response to the fluid levels sensed by the fluid sensing means, the motor including switch activation means associated therewith and being mounted for arcuate movement about a pivot point, and switch means for alternately controlling the forward and reverse phases of the motor, the switch means being mounted and positioned in the arcuate path of travel of the switch activation means, whereby a rise of the fluid level within the pipe will be sensed by the fluid sensing means and automatically electrically activate the motor to turn the gate valve into the closed position in order to occlude the fluid path and seal the forward exit section of the pipe from the rear exit section thereof, while the continued operation of the motor causes the motor and the associated switch activation means to move arcuately about the pivot point and move the switch means to simultaneously deactivate the motor and change the phase of the motor from the forward phase to the reverse phase, while a lowering of the fluid level in the pipe will similarly be sensed, and the reverse of each of the operational steps will be achieved in order to open the fluid flow path and reset the motor phase to the forward phase.

In connection with the foregoing object, it is a further object of the invention to provide a system for automatically operating a gate valve of the type described, wherein the motor and the switch activation means are fixedly interconnected and carried on a holding plate such that the motor as well as the switch activation means will rotate about a pivot point thereby to move the switch activation means throughout an arcuate path of travel, with the switch means controlling the forward and reverse phases of the motor being located such that the switch activation means will strike the switch means as the motor and switch activation means rotate throughout the arcuate path of travel.

In conjunction with the foregoing object, it is a further object of the invention to provide a system of the type described wherein the system is provided with a mounting standard for fixed securement to an underlying support surface in juxtaposition with respect to an existing gate valve, such that said system may be retrofitted to an existing gate valve without requiring any additional valves or other accoutrements to be added to the existing sewer system.

In conjunction with the foregoing object, it is a further object of the invention to provide a system for automatically opening and closing a gate valve, of the type described, wherein the motor and switch activation means and switch means are mounted on a bar which may, in turn, be adjusted such that said system may be easily applied to an existing gate valve with adjustments being capable in order to accurately and properly amount the system both vertically and horizontally with respect to the existing gate valve.

Further features of the invention pertain to the particular arrangement of the parts whereby the above-outlined and additional operating features thereof are attained.

The invention, both as to its organization and method of operation, together with further objects and advantages thereof will best be understood by reference to the following specification taken in conjunction with the accompanying drawings.

BRIEF SUMMARY OF THE INVENTION

In summary, the present invention is directed to a system which may be retrofitted to an existing gate valve of the type positioned in a sewer system for alternately opening and closing the fluid path traversing the sewer pipe, the system being designed to be affixed to the existing gate valve, and includes fluid sensing means positioned in the forward section of the sewer pipe adapted to sense the fluid level within the pipe, a two phase motor having a forward phase and a reverse phase operationally associated with the gate valve for alternately opening and closing the gate valve and therefore opening and closing the fluid path traversing the pipe, electrical means interconnecting the fluid sensing means from the motor thereby to activate the motor in response to the fluid level as sensed by the fluid sensing means, the motor including switch activation means associated therewith and mounted for arcuate movement about a pivot point, and switch means for alternately controlling the forward and reverse phases of the motor, the switch means being mounted and positioned for activation by the switch activation means as the same traverses an arcuate path of travel.

DETAILED DESCRIPTION OF DRAWINGS

Figure 1:
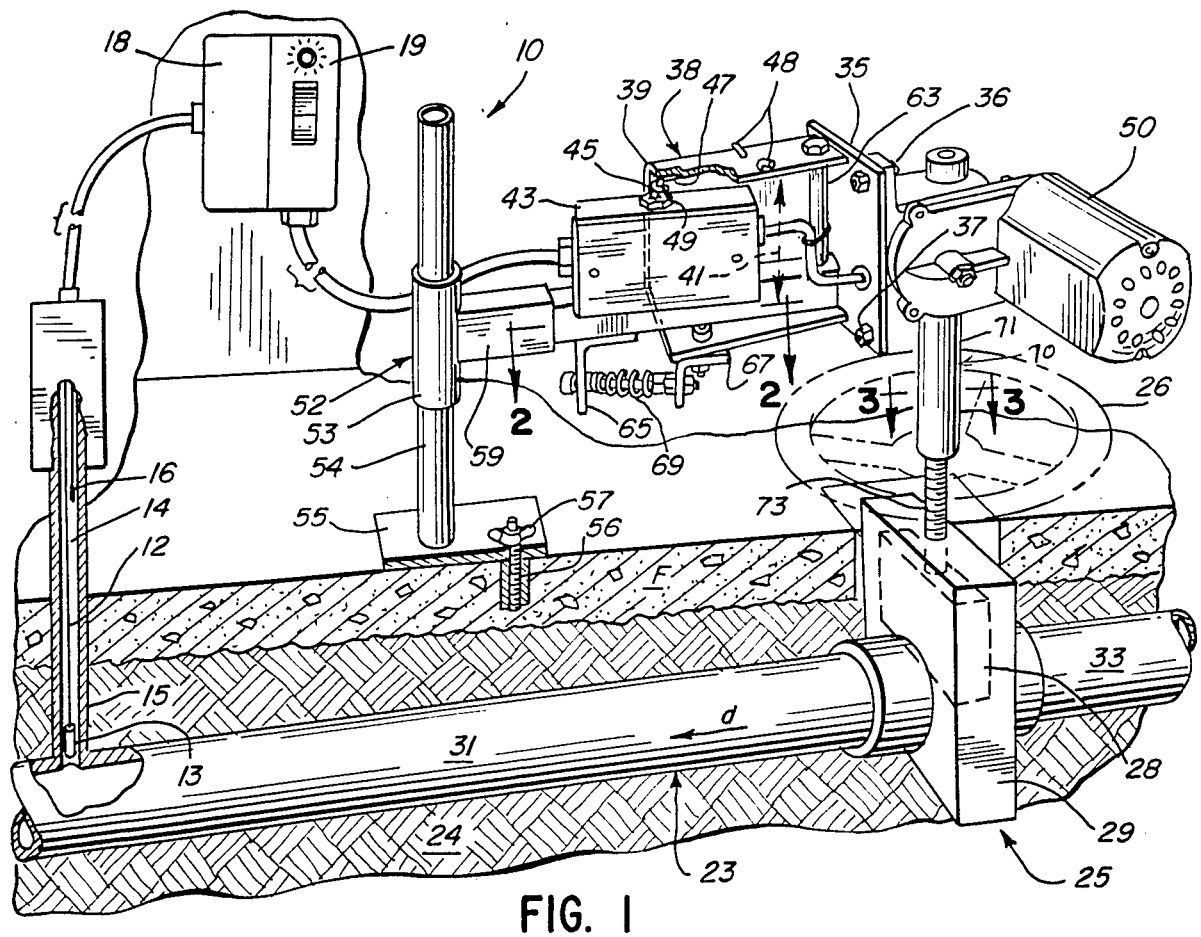
FIG. 1 is a perspective view showing various components of the automatic gate valve opening and closing system of the present invention.

The overall system of the present invention is depicted in FIG. 1 of the drawings, and represents the automatic system for alternately opening and closing the gate valve. The system 10 is shown to include fluid sensing means 12 which is formed by fluid probe 13, which is interconnected by a pair of electrical contacts 14 and 16 respectively, to a relay 18. The relay 18 is in turn connected to an on/off switch 19 for supplying electrical power to the system and to a reversing switch 45 which controls the operation of the motor 50.

As shown in FIG. 1 of the drawings, the sewer pipe 23 as shown to be positioned in subflooring 24 and includes a gate valve assembly 25 which is a typical installation as may be found in residential as well as commercial installations. As depicted in phantom in FIG. 1, a typical gate valve assembly 25 usually includes a manual wheel 26 which operates the valve block 28 within the valve housing 29. The valve housing 29 in effect, divides the sewer pipe 23 into a forward exit section 31, and a rear exit section 33 as shown in FIG. 1. In the typical sewer installation, the fluid flow path is in the direction of the arrow D thereby to exit from the building installation, and enter into the municipal sewer system as is well known in the art.

Figure 4:
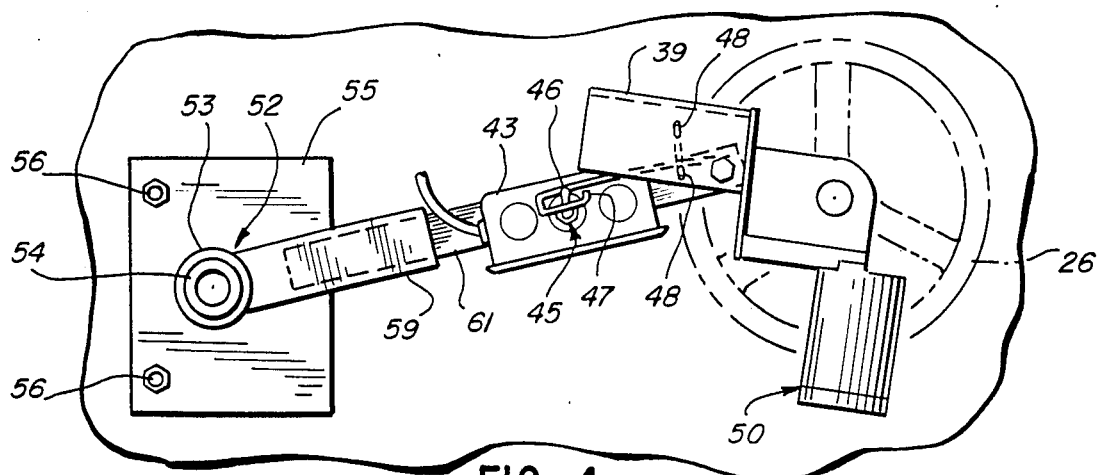
FIG. 4 is a top perspective view, showing the overview of the automatic gate valve opening and closing system of the present invention, with the motor set in its non-pivotted position.
Figure 5:
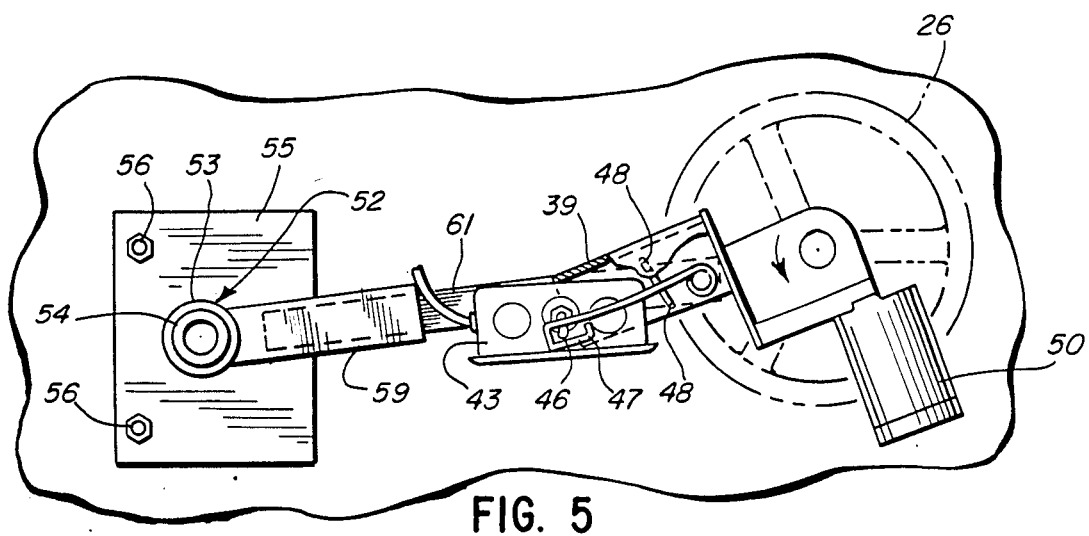
FIG. 5 is a top perspective view showing the automatic gate valve opening and closing system of the present invention, with the motor in its pivoted position with the switch activation means having been pivoted and in acitvated position relative to the switch means.

As indicated previously, the automatic gate valve closure system of the present invention is shown to include a motor 50, which is secured to a mounting plate 35 by means of lug bolts 36 and 37 respectively. The mounting plate 35 further includes switch activation means 38 which is basically formed by a U shaped plate 39 welded to, or otherwise formed integrally with the mounting plate 35. It will be observed that the U shaped plate 39 includes an open section depicted by the numeral 41 which accommodates therebetween a switch box 43 as indicated in FIGS. 1, 4 and 5. Switch box 43 is shown to include a two position switch 45 which is reciprocated between the two positions by means of a wire pull 47 coupled to its toggle 46. The wire pull 47 is interconnected to the U shaped plate 39 by means of a pair of holding legs 48 and to the switch 45 by switch loop 49.

The entire system is shown to be carried by a standard 52 which, is in turn, slideable carried on a mounting rod 54 which is formed integrally with a support plate 55 which may, in turn, be bolted to the underlying flooring F by lug bolts 56 and held in position by wing nut 57. The precise manner of mounting the support plate to the underlying flooring 55 is not deemed to be critical to the inventive subject matter herein, since any manner of securely fastening the support plate 55 to the flooring may be utilized. It will also be apparent that the standard 52 may include any typical type of lock mechanism (not shown) for locking the standard 52 in any desired position along the mounting rod 54. For example, a threaded holding bolt may be employed if desired, or in the alternative, a threaded aperture may be applied through collar 53 through which a threaded bolt may be applied in order to securely lock the standard 52 in any desired position along the mounting rod 54.

The standard 52 further includes a horizontal sleeve 59 which accommodates a slideably moveable support rod 61 therein. The support rod 61 is shown to support the switch box 43 containing the two position switch 45 therein, as well as to support the U shaped plate 39 carrying the motor 50 thereon. The combined U shaped plate 39 and the motor 50 are shown to be pivotally mounted to the support rod 61 by means of a bolt 63 positioned through appropriate apertures through the U shaped plate 39 in order to securely set the bolt 63 in position. As will be observed in FIGS. 1, 4 and 5 of the drawings, the open section 41 of the U shaped plate 39 is sized such that it will clearly accommodate therebetween the switch box 43 as well as the dimensional sizing of the support rod 61. As indicated, the entire assembly including the U shaped plate 39 as well as the motor 50 is designed to pivot about the bolt 63 in a manner which would be indicated hereinafter.

Figure 2:
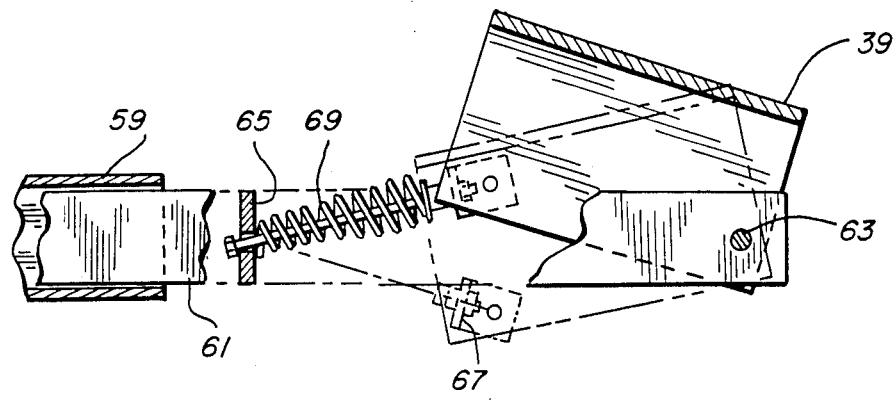
FIG. 2 is a top plan view, being cross-sectioned, showing the switch activation means in position relative to the switch means, taken in the direction of the arrows along line 2—2 of FIG. 1.

The underside of the support rod 61 is shown to include an L shaped bracket 65 which has one leg thereof secured to the support rod 61, and has the opposed leg thereof extending downwardly from the underside of the support rod 61. Similarly, the outer surface of the lower portion of the U shaped plate 39 includes an L shaped bracket 67 which again includes one leg thereof secured to the U shaped plate 39, and the opposed leg extending downwardly therefrom. As shown in FIGS. 1 and 2 of the drawings, a compression spring 69 is fixedly secured between the two vertically extending legs of the respective L shaped bracket 65 and 67 respectively.

The motor is shown to further include a square motor shaft 70 which is operated by the motor 50, surrounded by a shaft rod 71 which has a square shaped internal bore being sized to accommodate the square motor shaft 70.

Figure 3:
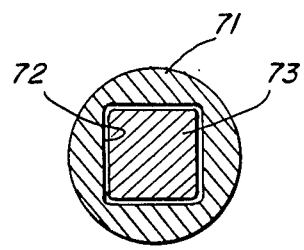
FIG. 3 is a cross-sectional view showing the relationship between the motor sleeve, and the gate valve shaft, taken in the direction of the arrows along the line 3—3 of FIG. 1.

As is well known in the art, the manual wheel 26 found mounted to the typical gate valve 25 is generally provided with a square shaped bore in order to accommodate the square shaft leading from the valve block 28. In the typical gate valve 25, the valve block 28 is reciprocated between the open and close position by means of a threaded shaft 73 the upper end of which is square shaped as depicted in FIG. 3. Hence, when the manual valve wheel 26 is turned, the threaded shaft 73 is similarly turned thereby to screw threadedly reciprocate the valve block 28 into position or out of position. The present invention contemplates substituting the manual valve wheel 26 by simply utilizing the shaft rod 71 which, as indicated, includes a square shaped bore 72 thereby to accommodate the positioning therein of the threaded shaft 73. Hence, once the motor shaft 70 commences turning, it will in turn turn the shaft rod 71, which in turn rotates the threaded shaft 73 in order to move the valve block 28 into and out of the occluding position.

Operationally, the switch 19 is operated between an on and an off position to supply and cut-off electrical power to the system, while the two position switch 45 is operated to control the forward and reverse phases of the motor 50. It will therefore be appreciated the present invention contemplates that the motor 50 be a two phase motor having both a forward and a reverse phase associated therewith.

Figure 6:
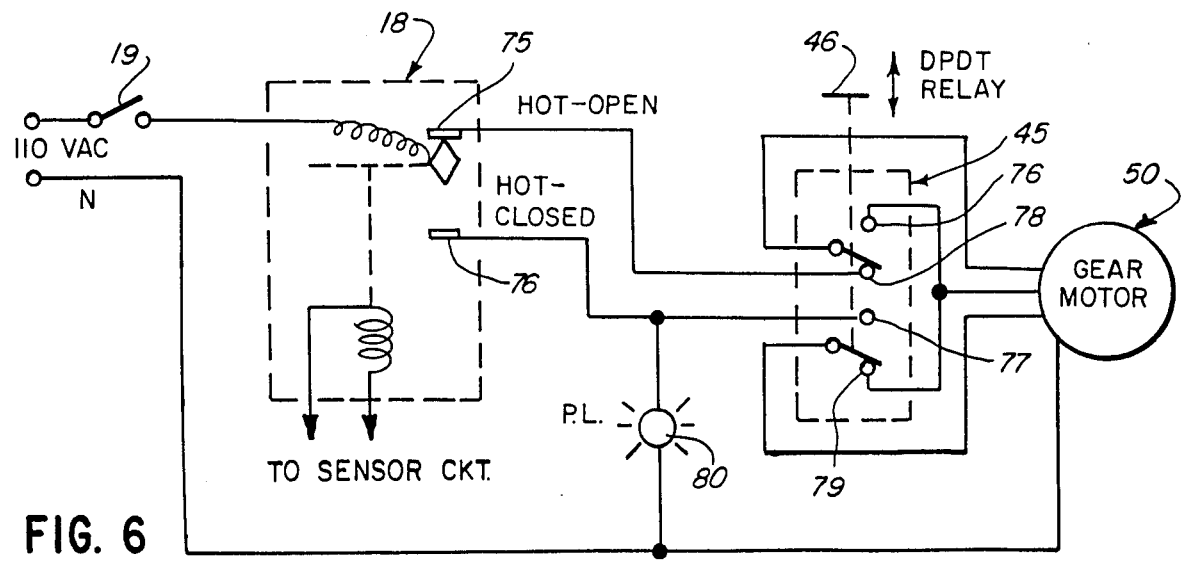
FIG. 6 is an electrical schematic showing the electrical circuitry of the present system for effecting the opening and closing of the gate valve, automatically pursuant to the present invention.

In operation, the switch 19 is operated to its on position. Initially, the switch 45 has been operated such that its contacts 76 and 77 are closed. Also, the relay contact 75 is closed. With specific reference to FIG. 1 of the drawings, in a normal situation, sewer water traverses the sewer pipe 23 in the direction of the arrow D and exists the subject building via the rear exit section 33, through the forward exit section 31, and into the municipal sewer. In those situations where excessive rain water or flood conditions occur, back pressure occurs, thereby forcing water back through the forward exit section 31 in the reverse direction of arrow D. It will be appreciated that as the back pressure of the water increases, water will be forced into the upstanding pipes 15 wherein the probe 13 is located. The probe 13 is designed to sense the presence of fluid, and close a circuit (not shown), which then sends an electrical signal via electrical contacts 14 and 16 respectively to relay 18. The relay then operates and, as illustrated in FIG. 6, closes the contact 74 to couple power through contacts 76 and 77 of the switch 45 to the motor 50. The motor 50 is activated and the motor shaft 70 is caused to turn, which in turn, causes a circular movement of the shaft rod 71. The concommitment rotational force is therefore applied to the threaded shaft 73 which commences the movement of the valve block 28 into an occluding position relative to the sewer pipe 23. It will also be appreciated that once the valve block 28 has been set into position within the valve housing 29, the motor 50, which is continuing to operate, and will continue to tend to rotate the motor shaft 70 will meet resistance since the valve block 28 has now bottomed. The torque associated with the motor 50 will now overcome the tension of the compression spring 69, and cause the U shaped plate 39 and motor 50 to pivot about the pivot pin 63. As the U shaped plate 39 pivots, the wire pull 47 will pull the toggle 46 of the two position switch to open the contacts 76 ad 77 and to close the contacts 78 and 79. As can be seen in FIG. 6, opening the contacts 76 and 77 shuts off the motor 50 since the relay contact 75 is open, thus there is no power coupled to the motor 50. Also, the reverse position motor is set by the switch 45 in its reverse phase position. The indicator light 80, at this time, is energized, to provide a visual indication that the valve block 28 is closed. As shown in FIG. 2, the pivotal movement of the U shaped plate 39 to the reverse phase position of the motor is shown in phantom. It will also be appreciated that once the water level in the pipe 23 subsides, the fluid probe 13 will again sense the lack of fluid, and will again send that information via electrical contacts 14 and 16 to the relay 18 to close contact 75, which will again activate the motor 50. At this time, once the motor is activated, since the motor 50 has been set in the reverse phase, the motor shaft 70 will turn in the reverse direction, which therefore reverses the movement of threaded shaft 73 thereby moving the valve block 28 to the upper or open position relative to sewer pipe 23. As the valve block 28 is moved to its highest position, and as the motor 50 continues to operate, the torque of the motor will overcome the tension, once again, of compression spring 29 and cause the U shaped plate 39 as well as the motor 50 to once again pivot about the pivot pin 63 thereby arcuately moving back to its original position as shown in solid lines in FIG. 2. This movement of the U shaped plate 39 will cause the wire pull 47 to once again pull the toggle 46 of the switch 45 to the opposed position thereby again opening the contacts 78 and 79 to turn off the power to the motor 50, and to set the motor in the forward phase thereof, simultaneously. The motor 50 is therefore set, when activated once again, to commence movement of the motor shaft 70 in the forward phase which will have the effect of again, turning the threaded shaft 73 in the forward phase thereby moving the valve block 28 back into an occluding position within the valve housing 29 to occlude pipe 23. The indicator light 80 also is de-energized, indicating that the valve block 28 is open.

It will also be appreciated from the manner in which the standard 52 is constructed, the collar 53 is movable along the vertical length of the mounting rod 54 such that the entire assembly may be adjusted in a vertical direction to any desired height depending upon the positioning of the gate valve 25 which may be located in any given installation. It will also be appreciated that the switch box 43 containing the switch 45, as well as the U shaped 39 and the motor 50 are mounted on the support rod 61 which is telescopically movable within the horizontal sleeve 59 forming a part of the standard 52. Hence, once the support plate 55 is securely bolted in position on a given flooring F, the entire assembly may be adjusted and moved into proper position such that the motor shaft 70 is in direct lineal alignment with the threaded shaft 73 of the gate valve 25. It will also be appreciated that the entire assembly which is connected to the support rod 61 and the standard 52 may be removed form the mounting rod 54 by simply disconnecting the locking means holding the collar 53 to the mounting rod 54 such that the assembly may be entirely removed. This facilitates the cleaning of the gate valve 25 when desired. Hence, the only permanent installations which are necessitated by the system of the present invention consists of the insertion of the upstanding pipe 15 to interconnect with the sewer pipe 23, and the fluid sensing means 12 which is contained within the upstanding pipe 15, and the permanent mounting of the relay 18 and motor switch 19. Of course, the support plate 55 is bolted in position, but the entire remaining assembly is, as indicated in FIG. 1 of the drawings, entirely carried by the support rod 61 such that the entire assembly may be easily removed.

It will also be appreciated that while the present invention is shown to be provided with a U shaped plate 39 as described, which functions to not only carry the wire pull for reciprocating the two phase switch to the two positions, but also carries the compression spring for setting the tension point at which the entire assembly will pivot about the pivot bolt 63, any mechanical equivalent can be employed in order to function in the manner indicated for the U shaped plate 39. Hence, any mechanical equivalent may be employed so long as the same operates to activate switch 45 as well as to employ tension means which must be overcome once the motor has caused the valve block to bottom out thereby to force the motor to pivot on a pivot point.

It will be appreciated that there has been provided by virtue of this invention, an improved, but yet simplified, automatic system for opening and closing an existing gate valve of the type generally operated by manual means, in any number of installations. The present system incorporates various components which are basically standard items, and therefore, the economic cost of constructing a system of the type described is minimal. On the other hand, the present system is efficient in that it operates automatically to either open or close the gate valve in response to the level of fluid in the sewer pipe, without the need of an operator to manually open or close the gate valve. It will also be appreciated that while the invention has been described with respect to obtaining power from an existing DC source, a battery pack may be provided such that the system could be operated out of a 12 volt battery system such that in the event that a main power outage were experienced, the automatic gate valve system of the present invention would operate. However, it is not deemed to be part of this invention since it is obvious that any number of electrical systems may be operated off of a battery pack or a generator system apart from a direct electrical system as may be found in any existing building structure, but it is deemed advantageous to indicate that the subject system may in fact be operated off of a battery system or a generator system apart from the existing electrical system.

While there has been described what is at present considered to be the preferred embodiments of the invention, it will be understood that various modifications may be made therein and it is intended to cover the appended claims all such modifications as followed in the true spirit and scope of the invention.

What is claimed is:

1. A system for automatically activating a gate valve of the type interposed in a pipe for alternately opening and closing the fluid path of a fluid traversing the pipe, the gate valve being positioned such as to divide the pipe into a forward exit section and a rear exit section, said system comprising in combination, fluid sensing means positioned in the forward exit section of the pipe adapted to sense the fluid level within the pipe, a two-phase motor having a forward phase and a reverse phase operationally associated with the gate valve for alternately opening and closing said gate valve thereby to open and close the fluid path traversing said pipe, electrical means interconnecting said fluid sensing means and said motor thereby to activate said motor in response to the fluid level sensed by said fluid sensing means, said motor including switch activation means associated therewith and both being mounted for arcuate movement about a pivot point, and switch means for alternately controlling the forward and reverse phases of said motor, said switch means being mounted and positioned in the arcuate path of travel of said switch activation means and said motor, whereby a rise of the fluid level within the pipe would be sensed by said fluid sensing means and automatically electrically activate said motor to turn said gate valve into the closed position thereby to occlude the fluid path and seal the forward exit section of the pipe from the rear exit section thereof, the continued operation of the motor causing said motor and associated switch activation means to move arcuately about the pivot point thereby to move said switch means to simultaneously deactivate said motor and change the phase of said motor from the forward phase to the reverse phase, while a lowering of the fluid level in the pipe will similarly be sensed by said fluid sensing means and reverse each of the operations thereby to open said gate valve and deactivate the motor while simultaneously resetting the phase of said motor to the forward phase.

2. The system for automatically activating a gate valve of the type described in claim 1 above, wherein said fluid sensing means comprises a fluid probe adapted to sense the presence of a fluid, said probe being electrically connected to an electrical relay, said relay being an electrical communication with said motor, whereby the presence of fluids sensed by said fluid probe as electrically transmitted to said relay, which in turn electrically relays said information to said motor thereby to activate said motor which, in turn, closes said gate valve.

3. The system for automatically activating the said gate valve of the type described in claim 1 above, wherein said gate valve further includes a threaded shaft screw threadedly mounted in a threaded collar, having one end operationally connected to said motor, and the opposed end thereof connected to an occluding block whereby activation of said motor will alternately screw said shaft downwardly to occlude the fluid path of the pipe, and upwardly to open the fluid path of the pipe in response to the presence of and lack of water as sensed by said fluid sensing means.

4. A system for automatically activating a gate valve of the type described in claim 1 above, wherein said electrical means for interconnecting said fluid sensing means of said motor includes a relay in electrical contact with said fluid sensing means, and with a relay switch which, in turn, is in electrical contact with said motor thereby to activate said motor in response to the electrical activation of said relay by said fluid sensing means.

5. The system for automatically activating a gate valve of the type described in claim 1 above, wherein said switch activation means associated with said motor as formed by a holding plate mounted to said motor and including a switch pull carried thereon at one end, and connected to said switch means of the opposed end thereof, said holding plate position to be arcuately movable with said motor above said pivot point thereby to alternately reciprocate said switch pull between two positions to control the forward and reverse phases, respectively, of said motor.

6. The system for automatically activating a gate valve of the type described in claim 1 above, wherein said system is further provided with a mounting standard for fixed securement to an underlying support surface, and having a support bar for carrying said switch means, switch activation means and motor in juxtaposition with respect to said gate valve.

* * * * *